United States Patent [19]

Severus-Laubenfeld

[11] 4,221,835
[45] Sep. 9, 1980

[54] COMPOSITE PANELS WHICH ARE NOT EASILY COMBUSTIBLE

[75] Inventor: Harald Severus-Laubenfeld, Winterthur, Switzerland

[73] Assignee: Swiss Aluminium Ltd., Chippis, Switzerland

[21] Appl. No.: 974,647

[22] Filed: Jan. 2, 1979

Related U.S. Application Data

[63] Continuation-in-part of Ser. No. 553,289, Feb. 26, 1975, abandoned.

[51] Int. Cl.² ............... B32B 7/02; B32B 3/26; B32B 5/18
[52] U.S. Cl. ..................... 428/215; 428/313; 428/315; 428/322; 428/921; 521/133
[58] Field of Search ............. 428/460, 461, 463, 920, 428/313, 315, 322, 921; 521/133

[56] References Cited

U.S. PATENT DOCUMENTS

| | | | |
|---|---|---|---|
| 3,090,761 | 5/1963 | Backlund et al. | 521/133 |
| 3,382,136 | 5/1968 | Bugel et al. | 428/461 |
| 3,467,569 | 9/1969 | Weber et al. | 428/463 |
| 3,589,975 | 6/1971 | Andrews et al. | 428/463 |
| 3,679,513 | 7/1972 | Addinall et al. | 428/461 |
| 3,711,365 | 1/1973 | Pyle | 428/461 |
| 3,723,139 | 3/1973 | Larkin et al. | 260/45.75 B |
| 3,823,099 | 7/1974 | Doyle | 521/133 |
| 3,967,033 | 6/1976 | Carpenter | 428/322 |
| 4,022,722 | 5/1977 | Prokai et al. | 521/133 |
| 4,122,203 | 10/1978 | Stahl | 428/322 |

Primary Examiner—William R. Dixon, Jr.
Attorney, Agent, or Firm—Bachman and LaPointe

[57] ABSTRACT

An improved lightweight, flame resistant composite panel is disclosed which is readily shaped at room temperature without the necessity of machining. The composite panel comprises a foamed rigid thermoplastic core sandwiched between a pair of metallic layers. The thermoplastic core contains inorganic fillers in powder form to add further flame resistant characteristics to the composite panel. The metallic layers are bonded to the core by means of a thin layer of adhesive which exhibits good strength at elevated temperatures.

12 Claims, 1 Drawing Figure

COMPOSITE PANELS WHICH ARE NOT EASILY COMBUSTIBLE

CROSS REFERENCE TO RELATED APPLICATION

This application is a Continuation in Part of U.S. patent application Ser. No. 553,289, filed Feb. 26, 1975 now abandoned.

BACKGROUND OF THE INVENTION

The present invention resides in an improved lightweight, flame resistant composite panel which is readily shaped at room temperature without the necessity of machining the panel.

Composite panels having a core of compact thermoplastic material sandwiched between a pair of metallic covering layers are known in the art. U.S. Pat. No. 3,382,136 to Bugel et al. discloses a typical moldable composite panel. The composite panel is made up of a core of a compact (i.e. not foamed) thermoplastic material, preferably polyethylene, sandwiched between a pair of metallic covering layers. The resulting composite panel is relatively lightweight and may be shaped by bending or the like without the necessity of machining. In order for the composite panels to be shaped it is important that they exhibit a high specific stiffness, the specific stiffness being defined by the modules of elasticity of the metallic cover layer times the moment of inertia divided by the specific weight of the composite panel. The plastic shaping of the composite panel requires that the plastic core have enough strength, especially shear strength to prevent the buckling of the metallic cover layer when the composite is bent.

While the above-noted prior art composite panels may be readily formed at room temperature they suffer the disadvantage of being rather flammable. According to the U.S. Uniform Building Code (UBC), the composite panel of the prior art, such as Bugel et al., which has a core of compact polyethylene, is a Class III material. The National Fire Protection Association (NFPA) rates the combustion behavior of the same type composite panel as a Class C material. Thus, the composite panel is less fire resistant than each of its components. This may result from a number of reasons, one being that the metallic covering layers become heat conductors in the case of a fire and cause the thermoplastic to melt. The adhesive is then brought into contact with the air which is disastrous in the case of adhesives which are combustible. Because of the relatively poor combustion characteristics of known prior art composite panels their use as construction materials is considerably limited.

Accordingly, it is the principal object of the present invention to provide a composite panel characterized by improved fire resistant properties.

It is a particular object of the present invention to provide a composite panel which is lightweight and which is characterized by a high specific stiffness.

It is a still further object of the present invention to provide a composite panel which is readily shaped at room temperature without the need for machining.

Further objects and advantages of the present invention will appear hereinbelow.

SUMMARY OF THE INVENTION

In accordance with the present invention the foregoing objects and advantages are readily obtained.

The present invention provides a highly flame resistant composite panel which is rated by the UBC and NFPA as a Class I and Class A building material respectively. The composite panel of the present invention is readily formed at room temperature without the necessity of machining.

In accordance with the present invention, a foamed thermoplastic core, having additions of inorganic substances, is formed by using a blowing agent thereby resulting in a core material having finely dispersed pores which contain a non-combustable gas mixture. The thermoplastic material is preferably rigid PVC without the addition of plasticizers. The preferred inorganic additions is a mixture of $Sb_2O_3$ and $Al(OH)_3$. The blowing agent for the preferred foamed thermoplastic of rigid PVC of the core material leads to a non-combustible gas mixture of 55% $N_2$, 15% $CO_2$, 15% $CO$ and 15% $NH_3$ dispersed in the pores of the foamed core. In accordance with the preferred embodiment of the present invention, the metallic covering layers are bonded to the core material by an adhesive comprising vinylresin, acrylic-resin and epoxy-resin which is applied in an organic solution.

DETAILED DESCRIPTION

Figure 1:
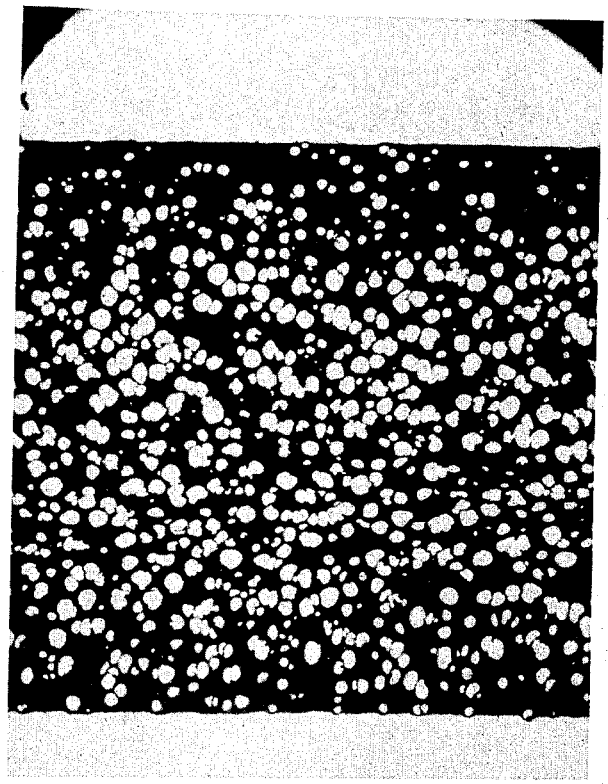
FIG. 1 is a photomicrograph showing the composite panel of the preferred embodiment of the present invention.

The core of the composite panel of the present invention comprises a thermoplastic material. A thermoplastic material must be chosen which, when exposed to flames, does not form droplets but rather tends to form a compact crust. Suitable thermoplastic may include olefinic thermoplastic polymers such as polyethylene, polypropylene and the like. In accordance with the present invention, the thermoplastic core should be in the form of a foamed thermoplastic core rather than a compact core. The preferred thermoplastic material is a rigid PVC (polyvinylchloride) without plasticizers. The PVC core is less flammable than polyethylene which is normally used in the prior art. By foaming the PVC the density thereof can be lowered thereby allowing for easy forming of the composite panel as will be explained hereinbelow. The preferred thickness of the thermoplastic core is from 1 to 10 mm.

In order to improve the fire resistant properties of the composite panel, inorganic filling powder is added to the plastic core material. Suitable inorganic powders include metallic oxides and/or hydroxides. In the preferred embodiment of the present invention, a mixture of $Sb_2O_3$ and $Al(OH)_3$ in proportion of weight of from 1:3 to 1:5 and preferably about 3:10 is preferred. The total inorganic powder addition should be in the range of from 7 to 20% by weight and preferably about 13% by weight of the weight of the PVC so as to increase the index of oxygen as will be expounded on hereinbelow. The particle size of the $Sb_2O_3$ and $Al(OH)_3$ ranges from about 0.2 to 10 microns. The $Al(OH)_3$ particles are coated with 2% by weight with respect to the $Al(OH)_3$ of stearic acid. The stearic coating aids in providing a good homogeneous distribution of the $Al(OH)_3$ and also of the $Sb_2O_3$ in the PVC.

As noted above, the composite panel of the preferred embodiment of the present invention comprises a foamed thermoplastic core and therefore a blowing agent is employed in the manufacture of the foamed core material. The preferred blowing agent employed for the preferred thermoplastic core of PVC leads to a foamed core having fine pores dispersed therein, the pores containing a non-combustable gas mixture of 55% $N_2$, 15% $CO_2$, 15% CO and 15% $NH_3$. By coating the foamed core with the impervious metallic layers the gas mixture remains in the foamed core and since said mixture is a non-combustible gas it improves the fire resistance of the rigid PVC. It should be appreciated that other non-combustable gas blowing agents may be employed.

By applying the blowing agent the density of the PVC is reduced from 1.4 $g/cm^3$ in its homogeneous compact condition to a density of 0.8 $g/cm^3$ in its foamed condition when pulverized with 13% by weight $Sb_2O_3$ and $Al(OH)_3$. The reduction in the density of the core material results in an increase in the specific stiffness of the composite panel thereby allowing the panel to be readily shaped at room temperature. The density is preferably in the range of from 0.5 to 1.2 $g/cm^2$.

As can be seen in FIG. 1, the gas bubbles produced by the blowing agent are distributed in a homogeneous manner in the rigid PVC core. The gas bubbles are situated under a thin layer of PVC and do not appear as crevices or pits on the surface of the PVC core. This even distribution of the gas bubbles is achieved by means of a direct intensive cooling of the extruded PVC strip at the end of the extrusion die, for example screw extruders and subsequent smooth rolls. The smooth external surfaces of the foamed core is important in that it allows for good adherence between the core and the metallic cover layers with only a thin, evenly distributed layer of adhesive of about 15 microns. A thin evenly distributed layer of adhesive is important in the overall flame behavior of the composite because, as pointed out above with regard to the prior art, the adhesive itself may lead to combustion.

The adhesives used to bond the plastic core to the metallic layers must not, when exposed to heat, become soft so that there is no shear strength at the interface between the core layer and the covering layers. If softening occurs the core will be able to slip out from between the cover layers and expose the adhesive to the fire. Furthermore, adhesives which do not contribute to the fire must be chosen, for example adhesives which are not easily combustible or are not very exothermic in burning. Besides the usual two component adhesives based on epoxy-resin and/or polyurethane, thermoplastic fusion adhesives of good heat resistance are used, for example a copolymer or graft polymer of olefin containing 70-90 weight percent ethylene or propylene, 3-9% of an aliphatic unsaturated $C_3$ to $C_5$ carbonic acid and 1-20% of a $C_1$ to $C_8$ alkylic ester of an aliphatic unsaturated $C_3$ to $C_5$ carbonic acid is preferred. A further preferred adhesive comprises vinyl-resin, acrylic-resin and epoxy-resin which is applied in an organic solution. The adhesive layer may have a thickness of from 5 to 100 microns, preferably 10 to 20 microns and ideally about 15 microns.

The metallic covering layers are preferably made of aluminum, copper, iron or an alloy based on one of these metals, the thickness of the strips used being 0.1-2 mm.

The process for surface treatment of Al cover layers and application of the adhesive is as follows. The Al cover layers are degreased by means of an alkaline degreasing agent. In order to improve the weather resistance of the strips they are treated with an aqueous solution of chromates and phosphates. The strips are then rinsed and dried and the side of the strip which is to be laminated to the core is coated with a priming layer of 2.5 $g/m^2$ of a solution of mixed polymer vinylchloride and vinylacetate. An adhesive having a dry thickness of about 15 microns comprising vinyl-resin, acrylic-resin and epoxy-resin is applied in an organic solution to the strip. The adhesive is dried in a run-through air floater oven and the outside of the composite is simultaneously lacquered.

The production of the composite is a continuous process. The extruded and calibrated core of foamed rigid PVC with the additives mentioned is laminated on both sides with the Al-strip, pretreated with adhesive and decorative lacquer, in a laminater.

The composite panels of the present invention have superior flammability properties when compared to composites heretofore known while remaining readily formable at room temperature. According to the UBC and the NFPA codes the composite panels of the present invention rate as Class I and Class A materials respectively.

Both the $Sb_2O_3$ and $Al(OH)_3$ additives as well as a foamed core, preferably of PVC, account for the superior properties of the present invention. The $Sb_2O_3$ and $Al(OH)_3$ additives improved the fire resistance of rigid PVC by increasing the lowest oxygen index (LOJ) from 45% $O_2$ to 52% $O_2$, the LOJ being the amount of oxygen in a mixture of $O_2$ and $N_2$ in which a test specimen can be inflamed.

The thermal decomposition of PVC generates HCL. It is probable that the chlorine reacts at high temperatures with the Al-covering layers to give $AlCl_3$ resulting in an increase in temperatures due to this exothermic reaction. However, by means of the addition $Sb_2O_3$, the chlorine from the PVC is bounded.

At burning temperatures, the $Al(OH)_3$ desintegrates into $Al_2O_3$ and $H_2O$ with a relatively high need of heat. The result is a withdrawal of heat from the hot core which produces a cooling effect. The generated water acts as an internal fire extinguisher.

The reduced density of the foamed core also results in a lower calorific value of the flammable part, the PVC, which is reduced from about 6500 to 3200 Kcal/kg. This decreased value leads to a clear improvement with the properties "flame spread" and "fuel contribution" according to ASTM E 84. The classification according to UBC and NFPA is based on the test according to ASTM E 84.

The composite panel can be shaped at room temperature without machining. This property is principally achieved by means of a relatively sturdy core layer of rigid foamed PVC with a density of 0.5-1.2 $g/cm^3$, preferably about 0.8 $g/cm^3$ which does not allow for the metallic cover layers to bend in.

As noted previously, known composite panels are not difficult to inflame or non-combustible according to ASTM E 84 test on which the classification of the corresponding UBC and NFPA classes are based.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A fire resistant composite panel which is readily formable at room temperature comprising:
   a foamed rigid thermoplastic core having a plurality of fine pores homogeneously disposed therein, said pores containing a non-combustible gas mixture comprising about 55% $N_2$, 15% $CO_2$, 15% CO and 15% $NH_3$;
   a metallic cover layer disposed on each side of said core; and
   adhesive means operable to bond said cover layers to said core, said adhesive means possessing good resistance to shear forces at elevated temperatures.

2. A composite panel according to claim 1 wherein said thermoplastic core has a density of from about 0.5 to 1.2 $g/cm^2$.

3. A composite panel according to claim 2 wherein said core thickness is from 1 to 10 mm, said metallic cover layers are from 0.1 to 2.0 mm thick and said adhesive has a thickness of from 10 to 20 microns.

4. A composite panel according to claim 3, wherein said adhesive means comprises adhesive layers composed of a copolymer of graftpolymer of olefin of 70 to 90 percent by weight ethylene or propylene, 3 to 9 percent by weight of an aliphatic unsaturated $C_3$ to $C_5$ carboxylic acid, and 1 to 20 percent by weight of a $C_1$ to $C_8$ alkylic ester of an aliphatic unsaturated $C_3$ to $C_5$ carboxylic acid.

5. A composite panel according to claim 3 wherein said adhesive means comprises an adhesive layer composed of vinyl-resin, acrylic-resin and epoxy-resin.

6. A composite panel according to claim 1 wherein said foamed rigid thermoplastic core is polyvinylchloride.

7. A composite panel according to claim 1 wherein said foamed rigid thermoplastic core further includes a powdered inorganic composition capable of increasing the fire resistant properties of said core.

8. A composite panel according to claim 7 wherein said inorganic powder includes metallic oxides and hydroxides.

9. A composite panel according to claim 7 said inorganic powder comprises a mixture of $Sb_2O_3$ and $Al(OH)_3$.

10. A composite panel according to claim 9 wherein the ratio of $Sb_2O_3$ to $Al(OH)_3$ by weight is from 1:3 to 1:5.

11. A composite panel according to claim 9 wherein the total inorganic powder is in the range of from 7 to 20% by weight of the weight of the core.

12. A composite panel according to claim 10 wherein the total inorganic powder is in the range of from 7 to 20% by weight of the weight of the core.

* * * * *